C. WEBER.
MACHINE FOR LABELING BOTTLES.
APPLICATION FILED JAN. 2, 1915.
1,196,911.
Patented Sept. 5, 1916.
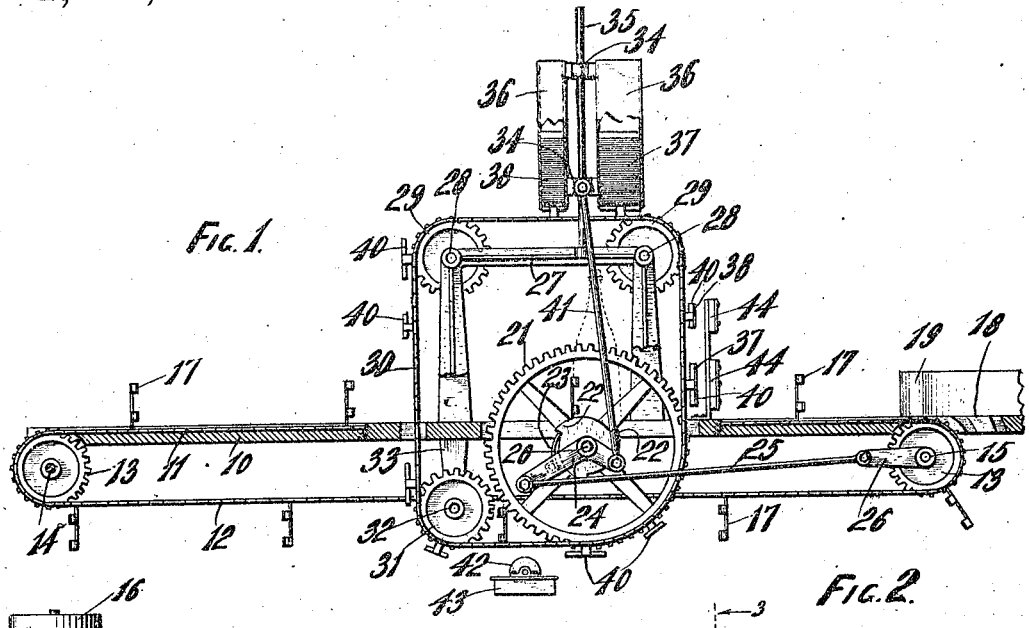
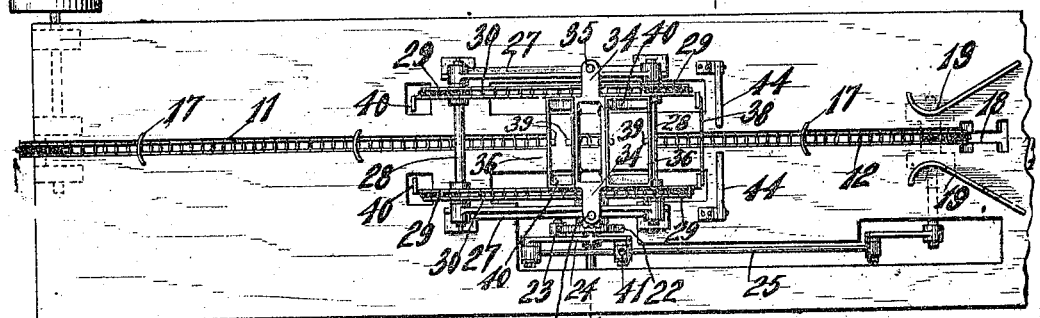
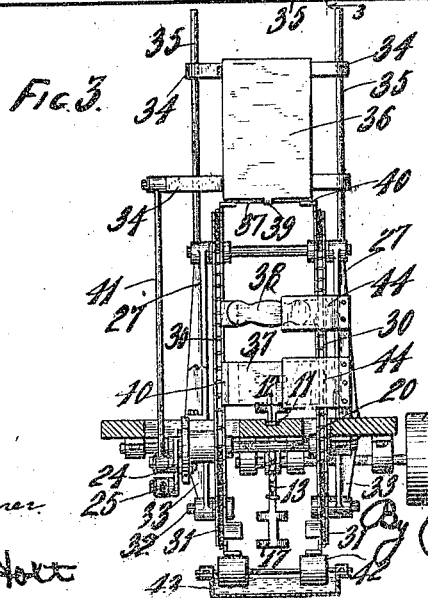
WITNESSES
INVENTOR
Cornelius Weber
ATTORNEY

UNITED STATES PATENT OFFICE.

CORNELIUS WEBER, OF MILWAUKEE, WISCONSIN, ASSIGNOR OF FORTY-NINE ONE-HUNDREDTHS TO INDUSTRIAL CHEMICAL INSTITUTE, OF MILWAUKEE, WISCONSIN.

MACHINE FOR LABELING BOTTLES.

1,196,911.  Specification of Letters Patent.  Patented Sept. 5, 1916.

Application filed January 2, 1915. Serial No. 9.

*To all whom it may concern:*

Be it known that I, CORNELIUS WEBER, a citizen of the United States, and resident of Milwaukee, in the county of Milwaukee and State of Wisconsin, have invented new and useful Improvements in Machines for Labeling Bottles, of which the following is a description, reference being had to the accompanying drawings, which are a part of this specification.

This invention has for its object to provide a machine for applying labels to bottles with a continuous feed thereof, the labels being taken by traveling chains from a reciprocating label hopper and conveyed to a position in the path of travel of the bottles where the label feeding mechanism pauses while the bottles continue in their travel to take the labels from the chains and carry them past the wipers by which they are pressed firmly against the bottles.

With the above and other objects in view the invention consists in the machine for labeling bottles as herein claimed and all equivalents.

Referring to the accompanying drawing in which like characters of reference indicate the same parts in the different views: Figure 1 is a longitudinal sectional elevation of a machine for labeling bottles constructed in accordance with this invention, the section thereof being taken on the plane of line 1—1 of Fig. 2; Fig. 2 is a plan view thereof; and Fig. 3 is a transverse sectional view on line 3—3 of Fig. 2.

In these drawings 10 indicates a table of any suitable construction which is provided with a groove 11 extending longitudinally thereof and within which travels a conveyer chain 12 passing around sprocket wheels 13 on shafts 14 and 15, the former of which is driven from any suitable source by having a belt passing around a driving pulley 16 thereof. The chain 12 at regular intervals is provided with upstanding conveyer flights 17, preferably in the shape of a double cross, with two sets of oppositely extending arms curved forwardly to engage a bottle and move the same forward as it stands on the table. At the point where the chain passes through the table at the discharge end of the conveyer formed thereby there is an opening 18 through the table of the same shape as the conveyer flights to permit of their passage therethrough without constituting a material obstruction to the path of the bottles as they slide upon the table, and diverging guide flanges 19 standing up from the surface of the table receive the bottles between them and confine them to the area inclosed thereby when they leave the conveyer should they not be removed from the table as rapidly as they are delivered by the conveyer. A shaft 20 is journaled in suitable bearings beneath the table and has fixed on it a pair of large sprocket wheels 21 passing through slots in the table. A ratchet wheel 22 also fixed on shaft 20 is engaged by a spring pawl 23 on a bell crank 24 which is loosely mounted on shaft 20, and a connecting rod 25 connects the longer arm of said bell crank with a crank 26 on shaft 15 so that the rotary movements of shaft 15 incident to the travel of the conveyer chain produces intermittent partial rotations of shaft 20 through the ratchet driving connection thereof.

An arch-like frame 27 is mounted on the table 10 on either side of the bottle conveyer and mounted in them above the level of the bottles on the conveyer are shafts 28 carrying idle sprockets 29 around which travel label feed chains 30 which are driven from the large sprocket wheels 21, and also pass around idle sprocket wheels 31 on stub shafts 32 mounted in brackets 33 beneath the table.

A pair of guide frames 34 are slidably mounted on upright standards 35 projecting from the frames 27 and carry one or more label hoppers or magazines 36, two of them being shown, one containing body labels 37, and the other containing neck labels 38. The stock of labels is pressed downwardly by weighted followers bearing thereon and is prevented from being forced bodily through the open bottoms of the hoppers by means of inwardly bent retaining lugs 39 at the bottom edges of the hoppers. The label hoppers are moved vertically on the guide standards 35 so as to bring the lowermost labels into contact with freshly glued label holders or pickers 40 carried by the chains 30 by means of one of the guide frames 34 being connected by a connecting rod 41 with the short arm of bell crank 24. The movements of the label hoppers 36 are so timed that they are lowered to bring their lowermost labels into contact with the label holders 40 just as the label feed chains 30 come to rest, the label hoppers then being raised while the pawl 23 is moved into engagement with the next tooth of the ratchet and the lowermost labels of both hoppers remain on the label holders where they are held by adhesion, the label holders having just previously passed over rollers 42 of a glue pan 43 beneath the table to receive a coating of adhesive therefrom. In the following feed movement of the label feed chains the labels are carried to a vertical position in the path of the bottles on the conveyer and come to rest just before the approach of a bottle so as to be taken thereby and immediately pressed against pairs of oppositely positioned wipers 44, preferably of heavy sheet rubber, mounted on the table and serving, as the bottles are forced therebetween, to press the labels firmly around the bottles so that they adhere thereto by means of the glue which is taken by the labels from the label holders.

By means of this invention an uninterrupted feed of bottles may be provided for, each bottle while in its travel having the labels presented in the path thereof with their edges straight and with adhesive applied thereto so that the traveling movement of the bottle takes the labels from the label holders and immediately forces them against the yielding wipers by which they are pressed into place. The label holders being straight and mounted on chains are capable of moving from a horizontal position, in which they receive the labels, to a vertical position in which the labels are removed therefrom without warping or bending the labels, and consequently the labels as stretched across the path of the bottles are in position to be most effectively coated with adhesive along their edges as they leave the label holders. The shape of the conveyer flights is such that they may have sufficient bearing against the bottle to insure the proper travel of the bottle and still be capable of passing through an opening in the table which does not materially obstruct the path of travel of the bottles.

What I claim as new and desire to secure by Letters Patent is:

1. A machine for labeling bottles, comprising a bottle conveyer, label feed chains at the sides of the bottle conveyer traveling from a horizontal position to a vertical position, label holders carried by the label feed chains, and a vertically movable label hopper adapted to engage its bottom label with the label holders in the upper horizontal flight of the label feed chains, the operation of the label feed chains being so timed with relation to the operation of the bottle conveyer as to present a label in the vertical position of the chains in position to be engaged by a bottle in its travel on the conveyer.

2. A machine for labeling bottles or the like, comprising a bottle conveyer, an intermittently operated shaft having an operative connection with the conveyer, sprocket wheels carried by the shaft on either side of the conveyer, idle sprocket wheels positioned above the conveyer, label feed chains passing around said sprocket wheels and changing from a horizontal travel above the bottle conveyer to a vertical travel in passing the bottle conveyer, label holders carried by the label feed chains, and a vertically movable label hopper adapted to be lowered to bring its end label into contact with the label holders on the horizontal portions of the chains during a period of rest thereof and said label holders carrying said label to a succeeding period of rest of the chains at the vertical position thereof where the label is held in the path of a bottle on the bottle conveyer.

3. A machine for labeling bottles or the like, comprising a table, a bottle conveyer chain mounted thereon, shafts at the ends of the table having sprocket wheels around which the chain passes, a crank arm on one shaft, a ratchet shaft journaled beneath the table, a lever having ratchet connection with the ratchet shaft, a connecting rod connecting the crank arm with the lever, sprocket wheels mounted on the ratchet shaft, idle sprocket wheels mounted above the table, chains passing around the said sprocket wheels and the idle sprocket wheels to have a horizontal path of travel above the table and a vertical path of travel through the table, vertical guides above the table, a label hopper slidably mounted on the guides, a connecting rod connecting the label hopper with the lever, label holders on the chains, means for applying glue to the surface thereof, said label holders traveling with the intermittent movements of the ratchet shaft and having a horizontal position of rest beneath the label hopper to have the end label thereof contact therewith and having a vertical position of rest in the path of the bottles on the bottle conveyer to have the labels removed therefrom by the bottles in their travel, and yielding wipers engaged by the bottles after engaging the labels for pressing the labels against the bottles.

4. A machine for labeling bottles, comprising a bottle conveyer, intermittently operated sprocket wheels at the sides thereof, suitably mounted idle sprocket wheels above the conveyer, label feed chains passing around the sprocket wheels, pairs of body and neck label holders on the chains at intervals, vertically movable label hoppers containing body and neck labels respectively adapted to lower their end labels into contact with the label holders in a horizontal position of rest thereof, said label holders having a vertical position of rest in the path of travel of the bottles on the bottle conveyer, and yielding wipers for engaging the body and neck labels as they are removed from the label holders by the bottle for pressing said labels firmly against the bottle.

In testimony whereof, I affix my signature, in presence of two witnesses.

CORNELIUS WEBER.

Witnesses:
R. S. C. CALDWELL,
KATHERINE HOLT.